(12) United States Patent
Vijayvergia et al.

(10) Patent No.: US 11,314,628 B2
(45) Date of Patent: Apr. 26, 2022

(54) SYSTEM FOR INTELLIGENT UNIT PERFORMANCE TESTING OF COMPUTER APPLICATIONS

(71) Applicant: Bank of America Corporation, Charlotte, NC (US)

(72) Inventors: Rohan Vijayvergia, Ajmer Rajasthan (IN); Sharma Satyen Raghavendra, Ahmedabad Gujrat (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/699,985

(22) Filed: Dec. 2, 2019

(65) Prior Publication Data
US 2021/0165729 A1  Jun. 3, 2021

(51) Int. Cl.
*G06F 11/36* (2006.01)
*G06N 20/00* (2019.01)
*G06F 9/455* (2018.01)

(52) U.S. Cl.
CPC ...... *G06F 11/3688* (2013.01); *G06F 9/45558* (2013.01); *G06F 11/3664* (2013.01); *G06N 20/00* (2019.01); *G06F 2009/45562* (2013.01)

(58) Field of Classification Search
CPC ............. G06F 11/3688; G06F 11/3664; G06F 9/45558; G06F 2009/45562; G06N 20/00
See application file for complete search history.

(56) References Cited

U.S. PATENT DOCUMENTS

| | | | |
|---|---|---|---|
| 6,421,822 B1 * | 7/2002 | Pavela | G06F 11/3664 |
| | | | 717/109 |
| 6,473,707 B1 | 10/2002 | Grey | |
| 8,756,586 B2 | 6/2014 | Khanapurkar et al. | |

(Continued)

OTHER PUBLICATIONS

Ben-Nun et al., "A Modular Benchmarking Infrastructure for High-Performance and Reproducible Deep Learning", 2019, IEEE (Year: 2019).*

(Continued)

*Primary Examiner* — Wei Y Zhen
*Assistant Examiner* — Junchun Wu
(74) *Attorney, Agent, or Firm* — Moore & Van Allen PLLC; Seongun M. Hong

(57) ABSTRACT

A system provides intelligent unit performance testing of computer applications. In particular, the system may provide an intelligent unit performance testing engine which may allow application developers to perform critical testing of the application during the software development life cycle for performance driven development. The engine may be invoked as either an offline or online process which may analyze applications based on certain performance testing parameters as specified by the developer. In this regard, the system may be configured to read performance testing-specific tags added by the developer to the source code of the application in development. Upon executing the performance testing, the output of the performance testing may be provided to the developer and/or other involved users within the application development process. In this way, the system may provide an effective way for a developer to conduct performance testing at earlier stages of the software development life cycle.

20 Claims, 4 Drawing Sheets

(56) References Cited

U.S. PATENT DOCUMENTS

| | | | |
|---|---|---|---|
| 8,776,026 B2 | 7/2014 | Candea et al. | |
| 8,782,215 B2 | 7/2014 | Pechanec et al. | |
| 8,799,867 B1 | 8/2014 | Peri-Glass et al. | |
| 9,009,677 B2 | 4/2015 | Zhao et al. | |
| 9,021,443 B1 | 4/2015 | Lachwani et al. | |
| 9,052,981 B2 | 6/2015 | Bassin et al. | |
| 9,183,123 B2 | 11/2015 | Spektor et al. | |
| 9,185,039 B1 | 11/2015 | Lachwani et al. | |
| 9,465,609 B2 | 10/2016 | Balasubramanian et al. | |
| 9,483,387 B1* | 11/2016 | Allocca | G06F 11/3684 |
| 9,645,916 B2 | 5/2017 | Wingfors et al. | |
| 9,703,686 B2 | 7/2017 | dos Santos et al. | |
| 9,710,364 B2 | 7/2017 | Herzig et al. | |
| 9,787,779 B2 | 10/2017 | Frank et al. | |
| 9,880,924 B2 | 1/2018 | Peck | |
| 9,910,765 B2 | 3/2018 | Wade | |
| 10,083,027 B2 | 9/2018 | Moorthi et al. | |
| 10,095,596 B1* | 10/2018 | Arguelles | G06F 11/263 |
| 10,180,836 B1 | 1/2019 | Arguelles et al. | |
| 10,235,277 B2 | 3/2019 | Herzig et al. | |
| 10,613,970 B1* | 4/2020 | Jammula | G06F 11/3688 |
| 10,896,756 B2* | 1/2021 | Cook | G16H 40/67 |
| 10,935,773 B2* | 3/2021 | Johnson | G06T 7/174 |
| 2004/0015792 A1* | 1/2004 | Kubista | G01R 31/318314 716/102 |
| 2008/0082470 A1* | 4/2008 | Sobhani Tehrani | G06F 17/00 706/45 |
| 2010/0257132 A1* | 10/2010 | Collard | G06Q 10/06 709/224 |
| 2013/0073488 A1* | 3/2013 | Anderson | G06Q 10/04 706/12 |
| 2014/0047227 A1* | 2/2014 | Breternitz | G06F 9/5066 713/2 |
| 2014/0109052 A1* | 4/2014 | Tempel | G06F 11/368 717/124 |
| 2014/0123110 A1* | 5/2014 | Wan | G06F 11/3672 717/124 |
| 2014/0372579 A1* | 12/2014 | Kikuchi | H04L 41/0806 709/222 |
| 2015/0347282 A1* | 12/2015 | Wingfors | G06F 11/3664 717/124 |
| 2015/0363292 A1* | 12/2015 | Shiraishi | G06F 11/008 717/125 |
| 2016/0003892 A1 | 1/2016 | Blancha et al. | |
| 2016/0078184 A1* | 3/2016 | Konerman | G16Z 99/00 706/12 |
| 2018/0113798 A1* | 4/2018 | Johnston | G06F 11/3604 |
| 2018/0137032 A1* | 5/2018 | Tannous | G06F 11/3664 |
| 2018/0210823 A1 | 7/2018 | Vorganti | |
| 2018/0287864 A1* | 10/2018 | Hockett | G06N 20/00 |
| 2018/0341573 A1 | 11/2018 | Patel et al. | |
| 2019/0295703 A1* | 9/2019 | Das | G16H 20/10 |
| 2020/0065230 A1* | 2/2020 | Kommera | G06F 11/3692 |
| 2020/0293436 A1* | 9/2020 | Carames | G06F 11/3688 |

OTHER PUBLICATIONS

Assis et al., "A Spatial Data Analytics Infrastructure for Large-Scale Thematic Mapping", 2019, ISPRS Int. J. Geo-Inf. (Year: 2019).*

AlGhmadi et al., "An Automated Approach for Recommending When to Stop Performance Tests", 2016, IEEE (Year: 2016).*

Kang et al., "Container and Microservice Driven Design for Cloud Infrastructure DevOps", 2016, IEEE (Year: 2016).*

Liu et al., "Design-Level Performance Prediction of Component-Based Applications", Nov. 2005, IEEE, vol. 31, No. 11 (Year: 2005).*

Bardac et al., "Scaling Peer-to-Peer Testing using Linux Containers", 2010, IEEE (Year: 2010).*

Hummer et al., "Testing Idempotence for Infrastructure as Code", 2013, IFIP pp. 368-388 (Year: 2013).*

* cited by examiner

200

```
┌─────────────────────────────────────────────────────────────┐
│ IDENTIFY A UNIT OF SOURCE CODE FOR PERFORMANCE TESTING,    │
│ WHEREIN THE SOURCE CODE COMPRISES ONE OR MORE UPT          │
│ TAGS COMPRISING ONE OR MORE UPT PARAMETERS                 │
│ 201                                                         │
└─────────────────────────────────────────────────────────────┘
                              │
                              ▼
┌─────────────────────────────────────────────────────────────┐
│ GENERATE A CONTAINER FOR TESTING THE UNIT OF SOURCE        │
│ CODE                                                        │
│ 202                                                         │
└─────────────────────────────────────────────────────────────┘
                              │
                              ▼
┌─────────────────────────────────────────────────────────────┐
│ EXECUTE A UPT PROCESS ON THE UNIT OF SOURCE CODE BASED     │
│ ON THE UPT PARAMETERS                                       │
│ 203                                                         │
└─────────────────────────────────────────────────────────────┘
                              │
                              ▼
┌─────────────────────────────────────────────────────────────┐
│ GENERATE A UPT OUTPUT COMPRISING RESULTS OF THE UPT        │
│ PROCESS, WHEREIN THE RESULTS OF THE UPT PROCESS            │
│ COMPRISES INFRASTRUCTURE HEALTH DATA                        │
│ 204                                                         │
└─────────────────────────────────────────────────────────────┘
                              │
                              ▼
┌─────────────────────────────────────────────────────────────┐
│ PUSH THE UPT OUTPUT TO ONE OR MORE COMPUTING SYSTEMS       │
│ 205                                                         │
└─────────────────────────────────────────────────────────────┘
                              │
                              ▼
┌─────────────────────────────────────────────────────────────┐
│ DELETE THE CONTAINER FOR TESTING THE UNIT OF SOURCE        │
│ CODE                                                        │
│ 206                                                         │
└─────────────────────────────────────────────────────────────┘
```

```
┌─────────────────────────────────────────────────────────────┐
│ RETRIEVE, FROM A UPT DATABASE, A SET OF UPT RESULTS FOR    │
│                  INFRASTRUCTURE ANALYSIS                    │
│                            401                              │
└─────────────────────────────────────────────────────────────┘
                              ↓
┌─────────────────────────────────────────────────────────────┐
│ EXECUTE, USING A MACHINE LEARNING ALGORITHM, A             │
│ COMPARISON OF INFRASTRUCTURE HEALTH DATA WITHIN THE SET    │
│                     OF UPT RESULTS                          │
│                            402                              │
└─────────────────────────────────────────────────────────────┘
                              ↓
┌─────────────────────────────────────────────────────────────┐
│ GENERATE A PROPOSED INFRASTRUCTURE ANALYSIS BASED ON       │
│     THE COMPARISON OF INFRASTRUCTURE HEALTH DATA           │
│                            403                              │
└─────────────────────────────────────────────────────────────┘
                              ↓
┌─────────────────────────────────────────────────────────────┐
│ RECORD THE PROPOSED INFRASTRUCTURE ANALYSIS TO THE UPT     │
│                         DATABASE                            │
│                            404                              │
└─────────────────────────────────────────────────────────────┘
                              ↓
┌─────────────────────────────────────────────────────────────┐
│ TRANSMIT THE PROPOSED INFRASTRUCTURE ANALYSIS TO ONE       │
│                      OR MORE USERS                          │
│                            405                              │
└─────────────────────────────────────────────────────────────┘
```

FIG. 4

SYSTEM FOR INTELLIGENT UNIT PERFORMANCE TESTING OF COMPUTER APPLICATIONS

FIELD OF THE INVENTION

The present disclosure embraces a system for intelligent unit performance testing of computer applications.

BACKGROUND

There is a need for a more effective way to perform application testing during development.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for intelligent unit performance testing of computer applications. In particular, the system may provide an intelligent unit performance testing engine which may allow application developers to perform critical testing of the application during the software development life cycle for performance driven development. The engine may be invoked as either an offline or online process which may analyze applications based on certain performance testing parameters as specified by the developer. In this regard, the system may be configured to read performance testing-specific tags added by the developer to the source code of the application in development. Upon executing the performance testing, the output of the performance testing may be provided to the developer and/or other involved users within the application development process. In this way, the system may provide an effective way for a developer to conduct performance testing at earlier stages of the software development life cycle.

Accordingly, embodiments of the present disclosure provide a system for intelligent unit performance testing of computer applications. The system may comprise a memory device with computer-readable program code stored thereon; a communication device; and a processing device operatively coupled to the memory device and the communication device. The processing device may be configured to execute the computer-readable program code to identify a unit of source code for performance testing, wherein the source code comprises one or more unit performance testing tags comprising one or more unit performance testing parameters; generate a container for testing the unit of source code; execute a unit performance testing process on the unit of source code based on the unit performance testing parameters; generate a unit performance testing output comprising results of the unit performance testing process; push the unit performance testing output to one or more computing systems; and delete the container for testing the unit of source code.

In some embodiments, the computer-readable program code further causes the processing device to detect, from the unit performance testing output, a unit performance testing failure associated with the one or more unit performance testing parameters; and restart the unit performance testing process using one or more remedial steps.

In some embodiments, the one or more remedial steps comprise changing infrastructure parameters associated with the unit of source code, wherein the infrastructure parameters comprise at least one of operating system, processing power, memory usage, and input/output operation rate.

In some embodiments, the one or more unit performance testing parameters comprise at least one of sequential load instances, parallel load instances, response time thresholds, load duration, and load type.

In some embodiments, the results of the unit performance testing process further comprise infrastructure health data before, during, and after the unit performance testing process.

In some embodiments, the computer-readable program code further causes the processing device to execute, using a machine learning algorithm, a comparison of the infrastructure health data; generate a proposed infrastructure analysis based on the comparison of the infrastructure health data; record the proposed infrastructure analysis to the unit performance testing database; and transmit the proposed infrastructure analysis to one or more users.

In some embodiments, the proposed infrastructure analysis comprises one or more suggested values for infrastructure parameters.

Embodiments of the present disclosure also provide a computer program product for intelligent unit performance testing of computer applications. The computer program product may comprise at least one non-transitory computer readable medium having computer-readable program code portions embodied therein, the computer-readable program code portions comprising executable code portions for identifying a unit of source code for performance testing, wherein the source code comprises one or more unit performance testing tags comprising one or more unit performance testing parameters; generating a container for testing the unit of source code; executing a unit performance testing process on the unit of source code based on the unit performance testing parameters; generating a unit performance testing output comprising results of the unit performance testing process; pushing the unit performance testing output to one or more computing systems; and deleting the container for testing the unit of source code.

In some embodiments, the computer-readable program code portions further comprise executable code portions for detecting, from the unit performance testing output, a unit performance testing failure associated with the one or more unit performance testing parameters; and restarting the unit performance testing process using one or more remedial steps.

In some embodiments, the one or more remedial steps comprise changing infrastructure parameters associated with the unit of source code, wherein the infrastructure parameters comprise at least one of operating system, processing power, memory usage, and input/output operation rate.

In some embodiments, the one or more unit performance testing parameters comprise at least one of sequential load instances, parallel load instances, response time thresholds, load duration, and load type.

In some embodiments, the results of the unit performance testing process further comprise infrastructure health data before, during, and after the unit performance testing process.

In some embodiments, the computer-readable program code portions further comprise executable code portions for executing, using a machine learning algorithm, a comparison of the infrastructure health data; generating a proposed infrastructure analysis based on the comparison of the infrastructure health data; recording the proposed infrastructure analysis to the unit performance testing database; and transmitting the proposed infrastructure analysis to one or more users.

Embodiments of the present disclosure also provide a computer-implemented method for intelligent unit performance testing of computer applications. The method may comprise identifying a unit of source code for performance testing, wherein the source code comprises one or more unit performance testing tags comprising one or more unit performance testing parameters; generating a container for testing the unit of source code; executing a unit performance testing process on the unit of source code based on the unit performance testing parameters; generating a unit performance testing output comprising results of the unit performance testing process; pushing the unit performance testing output to one or more computing systems; and deleting the container for testing the unit of source code.

In some embodiments, the method further comprises detecting, from the unit performance testing output, a unit performance testing failure associated with the one or more unit performance testing parameters; and restarting the unit performance testing process using one or more remedial steps.

In some embodiments, the one or more remedial steps comprise changing infrastructure parameters associated with the unit of source code, wherein the infrastructure parameters comprise at least one of operating system, processing power, memory usage, and input/output operation rate.

In some embodiments, the one or more unit performance testing parameters comprise at least one of sequential load instances, parallel load instances, response time thresholds, load duration, and load type.

In some embodiments, the results of the unit performance testing process further comprise infrastructure health data before, during, and after the unit performance testing process.

In some embodiments, the method further comprises executing, using a machine learning algorithm, a comparison of the infrastructure health data; generating a proposed infrastructure analysis based on the comparison of the infrastructure health data; recording the proposed infrastructure analysis to the unit performance testing database; and transmitting the proposed infrastructure analysis to one or more users.

In some embodiments, the proposed infrastructure analysis comprises one or more suggested values for infrastructure parameters.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
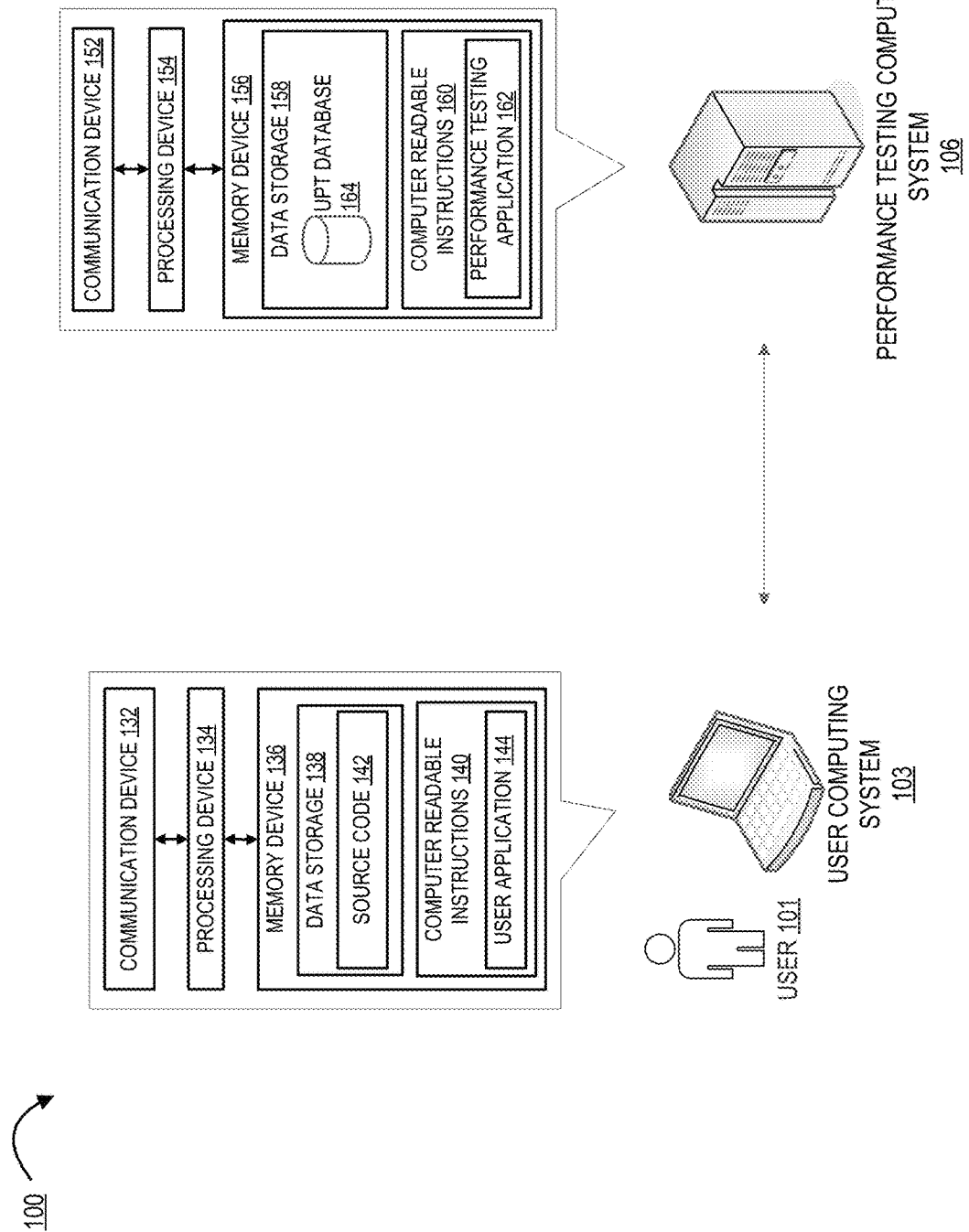
Figure 3:
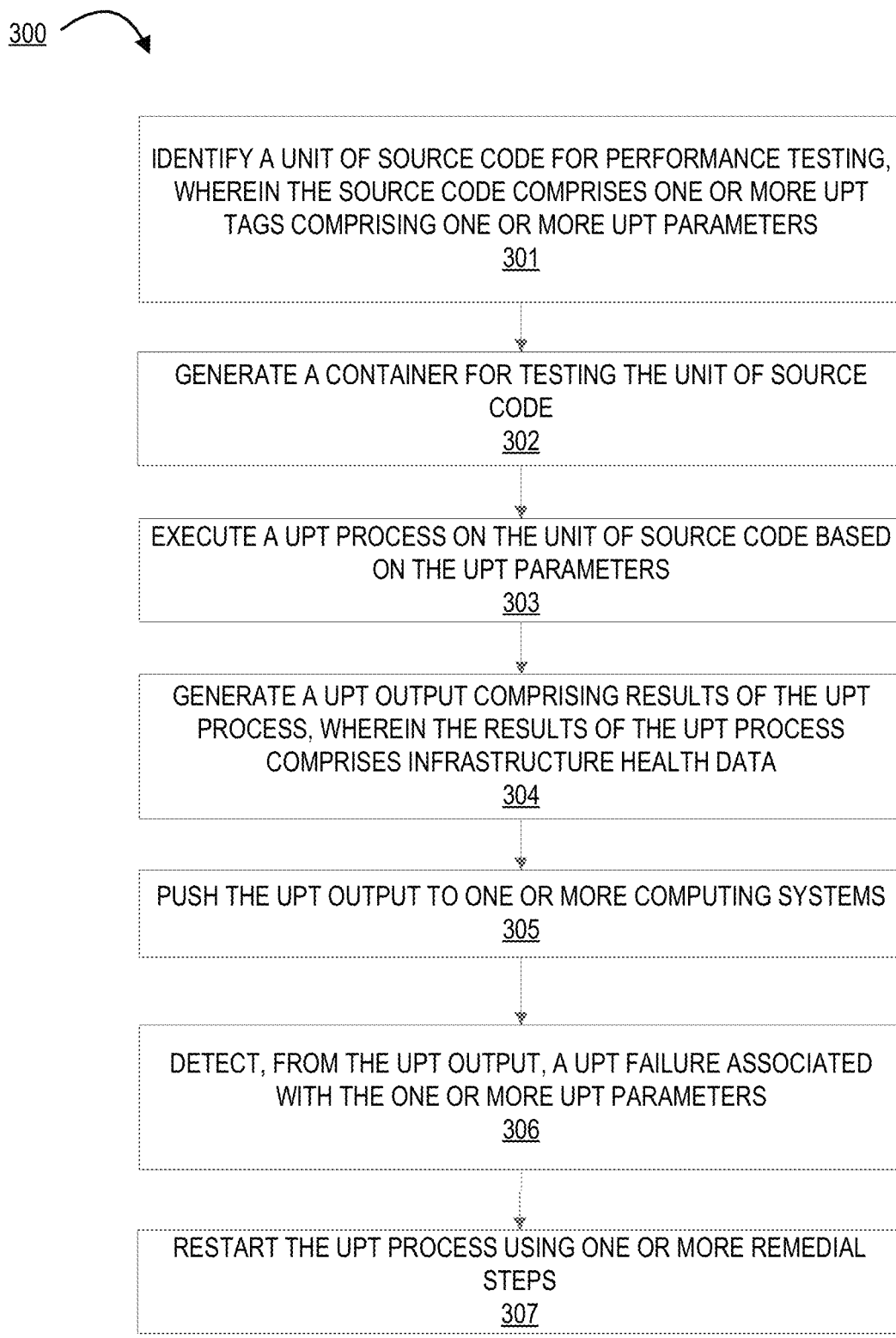

Having thus described embodiments of the invention in general terms, reference will now be made to the accompanying drawings, wherein:

FIG. 1 illustrates an operating environment for the intelligent unit performance testing system, in accordance with one embodiment of the present disclosure;

FIG. 2 illustrates a process flow for an offline mode of the intelligent unit performance testing engine, in accordance with one embodiment of the present disclosure;

FIG. 3 illustrates a process flow for an online mode of the intelligent unit performance testing engine, in accordance with one embodiment of the present disclosure; and FIG. 4 illustrates a process flow for infrastructure analysis using an infrastructure analyzer, in accordance with some embodiments of the present disclosure.

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity, or a third party who is not related to the entity.

Accordingly, the term "user device" or "mobile device" may refer to mobile phones, personal computing devices, tablet computers, wearable devices, and/or any stationary or portable electronic device capable of receiving and/or storing data therein.

In the context of computer application development, developers may conduct performance testing of the application to ensure the application will function and perform as intended under expected conditions in the production environment. The performance testing may be conducted along certain dimensions, such as response time, stability, resilience, computing resource usage (e.g., memory, processing power, storage usage, networking bandwidth, and the like), and the like when the application is deployed within a particular infrastructure (e.g., operating system, architecture and specification of the processor, memory, and storage, network peripherals, and the like). Accordingly, application performance testing may include specifying certain parameters to simulate conditions and/or events that the application may encounter in the production environment, where the parameters may include concurrent or sequential user load, calls for certain functions, load duration, and the like, and any combination thereof. By adjusting parameters, the developer may be able to simulate normal user behavior, usage spikes, parallel and serial usage, and the like.

Accordingly, the system as described herein provides for intelligent unit performance testing ("UPT") of an application during the develop stages, even early on in the software development life cycle ("SDLC"). In this regard, users/developers may add certain annotations (e.g., "UPT tags") in the source code of the units on which the performance testing is to be conducted. In an exemplary embodiment, a UPT tag may be denoted in the source code by an annotation in the form of "@UPT" followed by a bracketed set of function calls and/or parameters. For example, the user may set parameters such as number of sequential and/or concurrent instances (e.g., simulating users connecting to application), desired response time for execution of certain unit functions, load duration, load cycles (e.g., a specified series of different types of sequential/concurrent loads and/or idle times over a set frequency and/or timeframe), or the like. In some embodiments, the parameters may be intelligently determined by the system (e.g., to determine infrastructure requirements, or the like).

Once the UPT tags have been inserted into the source code, a UPT engine may read the UPT tags in the source code and initiate the performance testing process based on the parameters as defined in the UPT tags. Each performance testing process may be completed in a separate container which may be generated before the performance testing process begins, such that the optimal application infrastructure may be selected at runtime. Once the performance testing process has completed, the results of the performance testing may be pushed to one or more computing systems, such as a UPT database, developer's workstations, administrator's computing systems, or the like. In some embodiments, the an infrastructure analyzer engine may further generate a report containing recommendations regarding the infrastructure used to execute the application based on the performance testing results and the current infrastructure on which the application was tested. For instance, the report may include a recommendation to allocate additional RAM to the process in order to ensure that the application performs as expected under certain conditions.

In some embodiments, the UPT process may be executed in an "offline" or "fire and forget" mode. In such embodiments, the UPT process may be executed in parallel with the SLDC process such that the SLDC process proceeds independently of the UPT process. Accordingly, the UPT process may be executed during the build process and the results of the UPT process may be outputted (e.g., to the UPT database, to the developers, or the like) to be analyzed at a later time.

In other embodiments, the UPT process may be executed in an "online" mode, in which the build process will end if the results of the UPT do not meet the predetermined criteria (e.g., the response time for executing a certain function is greater than the maximum allowable threshold). Accordingly, in the online mode, the SLDC process may be dependent on the output of the UPT process (e.g., the UPT process is integrated into the SLDC process). If a UPT failure causes the build process to terminate, modifications may be made to the source code and/or the infrastructure before the UPT process is executed again. For instance, the system may allocate additional processing power to reduce the response time of the function to ensure that the response time falls below the predefined threshold.

The system as described herein confers a number of technological advantages over conventional systems for application development. For instance, by allowing the performance testing processes to be conducted at build time, modules that do not perform as expected or specified may be detected and remediated at earlier stages of the SDLC. Furthermore, an infrastructure analyzer engine may dynamically generate predictions and recommendations with regard to target environment/infrastructure to ensure that the performance of the application may be optimized.

Turning now to the figures, FIG. 1 illustrates an operating environment 100 for the intelligent unit performance testing system, in accordance with one embodiment of the present disclosure. In particular, FIG. 1 illustrates a performance testing computing system 106 that is operatively coupled, via a network, to a user computing system 103. In such a configuration, the performance testing computing system 106 may, in some embodiments, transmit information to and/or receive information from the user computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. For example, though the user computing system 103 and the performance testing computing system 106 are depicted as separate systems in FIG. 1, the functions of both systems may be performed by a single computing system. Furthermore, a single system, device, or server as depicted in FIG. 1 may represent multiple systems, devices, or servers. For instance, though the user computing system 103 is depicted as a single unit, the operating environment 100 may comprise multiple different user computing systems 103 operated by multiple different users.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the performance testing computing system 106 may be a computing system that performs the intelligent unit performance testing and infrastructure analysis functions as described herein. Accordingly, the performance testing computing system 106 may comprise a communication device 152, a processing device 154, and a memory device 156. The performance testing computing system 106 may be a device such as a networked server, desktop computer, terminal, or any other type of computing system as described herein. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the user computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a performance testing application 162 which executes the UPT and infrastructure analysis processes as described herein. In some embodiments, the memory device 156 includes data storage 158 for storing data related to the system environment. In this regard, the data storage 158 may comprise a UPT database 164, which may include various types of data, metadata, executable code, or other types of information regarding the UPT and infrastructure analysis processes, such as UPT output/results, machine learning/artificial intelligence data, application metadata (e.g., application type, expected performance, infrastructure health and/or recommendations, average load and duration, or the like), or the like.

The performance testing application 162 may comprise computer-executable program code which may instruct the processing device 154 to perform certain logic, data processing, and data storing functions of the application to accomplish the entity's objectives. For instance, the performance testing application 162 may, based at least partially on the information within the UPT database 164, perform unit performance testing processes on applications in development upon detecting UPT tags within the source code. The performance testing application 162 may further analyze UPT process results to determine optimal infrastructure setups and other environmental conditions for the application.

As further illustrated in FIG. 1, the operating environment 100 may further comprise a user computing system 103 in operative communication with the performance testing computing system 106. The user computing system 103 may be a computing system that is operated by a user 101, such as an administrator, agent, or employee of the entity. In some embodiments, the user 101 may be a developer of the application for which unit performance testing will be conducted. Accordingly, the user computing system 103 may be a device such as a desktop computer, laptop, IoT device, smartphone, tablet, single-board computer, or the like. The user computing system 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The user computing system 103 may comprise a processing device 134 operatively coupled to a communication device 132 and a memory device 136 having data storage 138 and computer readable instructions 140 stored thereon. The data storage 138 may comprise source code 142 for an application or a component of the application for which performance testing is to be conducted. Accordingly, the source code 142 may comprise one or more UPT tags which may be detected by the UPT engine to perform the performance testing process based on the parameters as set by the user 101 within the UPT tags. The computer readable instructions 140 may comprise a user application 144 which may receive inputs from the user 101 and produce outputs to the user 101. In particular, the user application 144 may comprise a source code editor through which the user 101 may modify the source code 142 (e.g., add code, create UPT tags, or the like). The user application 144 may further comprise various applications which allow the user 101 to interact with the performance testing computing system 106 (e.g., viewing UPT results, view infrastructure health or infrastructure recommendations, or the like).

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for an offline mode of the intelligent unit performance testing engine, in accordance with some embodiments of the present disclosure. The process 200, which may be triggered/invoked by a developer (e.g., in parallel with the SDLC process at build time), begins at block 201, where the system identifies a unit of source code for performance testing, wherein the source code comprises one or more UPT tags comprising one or more UPT parameters. In particular, the system may intelligently identify the various UPT functions at the time of compilation (e.g., using a machine learning algorithm). The UPT tags, which may be embedded within the unit of source code of the application to be tested, may take the form of a function call which takes the form of @UPT(x), where x represents the one or more UPT parameters which may be specified by the developer. The one or more UPT parameters may specify various testing events and conditions which may be intended to simulate the environment into which the application is to be deployed (e.g., user load over time). Accordingly, examples of such UPT parameters may include a number of sequential function calls (e.g., 10000 sequential calls to check the impact to infrastructure), concurrent function calls (e.g., 10000 concurrent calls to perform load testing across multiple processing threads), load durations (e.g., one hour of continuous usage), performance requirements (e.g., a threshold response time of 1000 ms), call rates (e.g., x number of calls per minute) or the like. In some embodiments, the UPT parameters may further include support for "spike" testing (e.g., sudden, acute increases in the number of function calls) and maximum load testing (e.g., the maximum expected user load while maintaining acceptable performance). In some embodiments, the user may further define infrastructure requirements in the source code for each test performed.

In some embodiments, the system may attempt to identify the unit of source code (e.g., using machine learning/natural language processing) according to a unique identifier associated with the unit of source code (which may be stored in a UPT database). If a match is found, the system may be configured to perform the UPT process based on historical UPT result data and/or infrastructure data associated with the identifier of the unit of source code. If no identifier is found, the system may generate a temporary identifier such that the UPT process is executed using general performance testing parameters and infrastructure settings.

The process continues to block 202, where the system generates a container for testing the unit of source code. The container (e.g., a software container) may include the various components necessary to execute the application from the source code (e.g., dependencies, libraries, executable code, frameworks, and the like). The system may, based on the unique identifier of the unit of source code, generate an individual container for each performance test executed on the particular unit of source code, where each container uses specified environmental settings (e.g., the infrastructure) at runtime. In this way, each performance test may be delineated in the database such that past performance test results and infrastructure health reports may be readily distinguished and identified.

The process continues to block 203, where the system executes a UPT process on the unit of source code based on the UPT parameters. The source code may contain multiple UPT tags that specify multiple different UPT parameters. For instance, the UPT parameters may comprise a sequential load of 3000 calls, followed by a continuous load for one hour, followed by a sudden spike of 2000 simultaneous calls, or the like. Accordingly, the system may, based on the UPT annotations in the source code, generate the objects necessary to create the testing loads. The infrastructure for executing the application may be designated at runtime on a per-container basis, as described above.

The process continues to block 204, where the system generates a UPT output comprising results of the UPT process, where the results of the UPT process comprises infrastructure health data. The infrastructure health data may include snapshots of the infrastructure before, during, and after execution of the performance testing process. Accordingly, the report and/or the infrastructure health data may comprise information such as response times, network latency, memory/storage usage, processing load, error/crash data, log files (e.g., debugging log), container information, or the like. The output may be subsequently analyzed via an infrastructure analyzer, as will be described in further detail below.

The process continues to block 205, where the system pushes the UPT output to one or more computing systems. In some embodiments, the UPT output may be pushed to a UPT database containing data on historical results associated with the identifiers of the units of source code. Accordingly, in some embodiments, the system may use the historical testing data to set testing parameters or conditions for subsequent tests involving each particular identifier. In some embodiments, the UPT database may further comprise application-specific metadata, such as application type, average load/duration of tests, expected test results, and the like. The UPT results may further be pushed to computing systems of the developer and/or other related parties to the SDLC process.

The process continues to block 206, where the system deletes the container for testing the unit of source code. In some embodiments, a container image (e.g., a snapshot of container components used during the testing process) may be stored within the UPT database for reference. Once the container image has been created and stored, the system may delete the container and subsequently create a new container when the UPT engine is triggered again.

FIG. 3 illustrates a process flow 300 for an online mode of the intelligent unit performance testing engine, in accordance with some embodiments of the present disclosure. In contrast with the "offline" or "fire and forget" mode as illustrated in FIG. 2, the SDLC process may be dependent on the outcome of the performance testing results. Accordingly, the process begins at block 301, where the system identifies a unit of source code for performance testing, wherein the source code comprises one or more UPT tags comprising one or more UPT parameters. The process continues to block 302, where the system generates a container for testing the unit of source code. The process continues to block 303, where the system executes a UPT process on the unit of source code based on the UPT parameters. The process continues to block 304, where the system generates a UPT output comprising results of the UPT process, where the results of the UPT process comprises infrastructure health data.

The process continues to block 305, where the system pushes the UPT output to one or more computing systems. In the online mode, the developer may alter the SDLC process based on the contents of the UPT output. Accordingly, the UPT output may be pushed to the developer's computing system, where the UPT output may comprise the performance testing results (e.g., unit performance data, response times, and the like) and/or infrastructure health data along a timeline, where the timeline may include data points for infrastructure health before, during, and after the performance testing process. In this regard, the UPT output may further comprise one or more predictions or projections regarding optimal infrastructure requirements for the unit. Based on the projections, the developer may (e.g., if the UPT results indicate that the unit will not perform as desired or specified) alter the infrastructure of the application before running another performance test.

The process continues to block 306, where the system detects, from the UPT output, a UPT failure associated with the one or more UPT parameters. A UPT failure may be an indication that the application unit does not perform to expected standards. Accordingly, examples of UPT failures may include response times above a specified threshold and/or unresponsiveness, processing errors, application crashes, or the like.

The process continues to block 307, where the system restarts the UPT process using one or more remedial steps. The remedial steps may be measures taken by the developer and/or system to remediate the UPT failures such that the application unit performs according to specifications (e.g., response times under a certain threshold, stability during usage spikes and/or extended periods of usage, ability to handle varying loads over time, and the like). Accordingly, examples of remedial steps may include infrastructure changes (e.g., allocation of additional memory/processing resources, increase in networking bandwidth, operating system and/or software upgrades, and the like), source code changes (e.g., code optimizations, bug fixes, and the like), hardware upgrades, and the like.

FIG. 4 illustrates a process flow 400 for infrastructure analysis using an infrastructure analyzer, in accordance with some embodiments of the present disclosure. The process begins at block 401, where the system retrieves, from a UPT database, a set of UPT results for infrastructure analysis. The set of UPT results may contain historical information regarding a particular performance test executed by the intelligent unit performance testing engine, such as infrastructure health data at various stages of the testing process. For example, the UPT results may contain infrastructure health data (e.g., response times, resilience, stability, and the like) for the application unit taken before, during, and after the performance testing process.

The process continues to block 402, where the system executes, using a machine learning algorithm, a comparison of infrastructure health data within the set of UPT results. In particular, the system may compare the changes, if any, to the infrastructure health data at various points in the testing process, as described above. For instance, the comparison may include an analysis of whether the changes to the infrastructure health before and during testing fall within an acceptable range (e.g., response time should not be increased beyond the specified threshold under load). If the infrastructure health remains within acceptable limits before, during, and/or after testing, the infrastructure analyzer may determine that no further changes to the infrastructure are necessary for the unit.

That said, if the infrastructure health deviates beyond acceptable limits before, during, and/or after testing, the process may proceed to block 403, where the system generates a proposed infrastructure analysis based on the comparison of infrastructure health data. The proposed infrastructure analysis may include proposed changes to the infrastructure, such as changes to the operating system and/or other software, processing power and/or architecture, available memory or storage, I/O operation rates, and the like. In some embodiments, the infrastructure analyzer may further propose application-specific changes, such as changes to settings or parameters of the application framework, or the like.

The process continues to block 404, where the system records the proposed infrastructure analysis to the UPT database. The proposed infrastructure analysis may further be associated with the current/historical infrastructure health data and/or testing data for the unit tested. In this regard, the proposed infrastructure analysis may contain suggested values for infrastructure parameters (e.g., an increase of allocated RAM from X MB to Y MB).

The process concludes at block 405, where the system transmits the proposed infrastructure analysis to one or more users. For instance, the proposed infrastructure analysis may be sent to application administrators and/or developers. The suggested values for infrastructure parameters may then be implemented before subsequent unit testing is performed. In this way, the system may optimize application performance by intelligently modifying infrastructure parameters.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent unit performance testing of computer applications, the system comprising:
   a memory device with computer-readable program code stored thereon;
   a communication device; and
   a processing device operatively coupled to the memory device and the communication device, wherein the processing device is configured to execute the computer-readable program code to:
      identify a unit of source code for performance testing, wherein the source code comprises one or more unit performance testing tags embedded within the unit of source code, the one or more unit performance testing tags comprising one or more unit performance testing parameters, wherein the one or more unit performance testing tags include function calls that define the one or more unit performance testing parameters;
      generate a container for testing the unit of source code, wherein the container is generated according to one or more infrastructure parameters, the one or more infrastructure parameters comprising random access memory ("RAM") allocation;
      execute a unit performance testing process on the unit of source code based on the unit performance testing parameters;
      generate a unit performance testing output comprising results of the unit performance testing process, wherein the unit performance testing output comprises one or more recommendations to adjust the one or more infrastructure parameters, the one or more recommendations comprising a recommendation to allocate additional RAM to the container at runtime, wherein the unit performance testing output further comprises one or more projections regarding optimal infrastructure requirements for the unit performance testing process;
      push the unit performance testing output to one or more computing systems; and
      delete the container for testing the unit of source code.

2. The system according to claim 1, wherein the computer-readable program code further causes the processing device to:
   detect, from the unit performance testing output, a unit performance testing failure associated with the one or more unit performance testing parameters; and
   restart the unit performance testing process using one or more remedial steps.

3. The system according to claim 2, wherein the one or more remedial steps comprise changing infrastructure parameters associated with the unit of source code, wherein the infrastructure parameters comprise at least one of operating system, processing power, memory usage, and input/output operation rate.

4. The system according to claim 1, wherein the one or more unit performance testing parameters comprise at least one of sequential load instances, parallel load instances, response time thresholds, load duration, and load type.

5. The system according to claim 1, wherein the results of the unit performance testing process further comprise infrastructure health data before, during, and after the unit performance testing process.

6. The system according to claim 5, wherein the computer-readable program code further causes the processing device to:
 execute, using a machine learning algorithm, a comparison of the infrastructure health data;
 generate a proposed infrastructure analysis based on the comparison of the infrastructure health data;
 record the proposed infrastructure analysis to a unit performance testing database; and
 transmit the proposed infrastructure analysis to one or more users.

7. The system according to claim 6, wherein the proposed infrastructure analysis comprises one or more suggested values for infrastructure parameters.

8. A computer program product for intelligent unit performance testing of computer applications, the computer program product comprising at least one non-transitory computer readable medium having computer-readable program code portions embodied therein, the computer-readable program code portions comprising executable code portions for:
 identifying a unit of source code for performance testing, wherein the source code comprises one or more unit performance testing tags embedded within the unit of source code, the one or more unit performance testing tags comprising one or more unit performance testing parameters, wherein the one or more unit performance testing tags include function calls that define the one or more unit performance testing parameters;
 generating a container for testing the unit of source code, wherein the container is generated according to one or more infrastructure parameters, the one or more infrastructure parameters comprising random access memory ("RAM") allocation;
 executing a unit performance testing process on the unit of source code based on the unit performance testing parameters;
 generating a unit performance testing output comprising results of the unit performance testing process, wherein the unit performance testing output comprises one or more recommendations to adjust the one or more infrastructure parameters, the one or more recommendations comprising a recommendation to allocate additional RAM to the container at runtime, wherein the unit performance testing output further comprises one or more projections regarding optimal infrastructure requirements for the unit performance testing process;
 pushing the unit performance testing output to one or more computing systems; and
 deleting the container for testing the unit of source code.

9. The computer program product according to claim 8, wherein the computer-readable program code portions further comprise executable code portions for:
 detecting, from the unit performance testing output, a unit performance testing failure associated with the one or more unit performance testing parameters; and
 restarting the unit performance testing process using one or more remedial steps.

10. The computer program product according to claim 9, wherein the one or more remedial steps comprise changing infrastructure parameters associated with the unit of source code, wherein the infrastructure parameters comprise at least one of operating system, processing power, memory usage, and input/output operation rate.

11. The computer program product according to claim 8, wherein the one or more unit performance testing parameters comprise at least one of sequential load instances, parallel load instances, response time thresholds, load duration, and load type.

12. The computer program product according to claim 8, wherein the results of the unit performance testing process further comprise infrastructure health data before, during, and after the unit performance testing process.

13. The computer program product according to claim 12, wherein the computer-readable program code portions further comprise executable code portions for:
 executing, using a machine learning algorithm, a comparison of the infrastructure health data;
 generating a proposed infrastructure analysis based on the comparison of the infrastructure health data;
 recording the proposed infrastructure analysis to a unit performance testing database; and
 transmitting the proposed infrastructure analysis to one or more users.

14. A computer-implemented method for intelligent unit performance testing of computer applications, wherein the method comprises:
 identifying a unit of source code for performance testing, wherein the source code comprises one or more unit performance testing tags embedded within the unit of source code, the one or more unit performance testing tags comprising one or more unit performance testing parameters, wherein the one or more unit performance testing tags include function calls that define the one or more unit performance testing parameters;
 generating a container for testing the unit of source code, wherein the container is generated according to one or more infrastructure parameters, the one or more infrastructure parameters comprising random access memory ("RAM") allocation;
 executing a unit performance testing process on the unit of source code based on the unit performance testing parameters;
 generating a unit performance testing output comprising results of the unit performance testing process, wherein the unit performance testing output comprises one or more recommendations to adjust the one or more infrastructure parameters, the one or more recommendations comprising a recommendation to allocate additional RAM to the container at runtime, wherein the unit performance testing output further comprises one or more projections regarding optimal infrastructure requirements for the unit performance testing process;
 pushing the unit performance testing output to one or more computing systems; and
 deleting the container for testing the unit of source code.

15. The computer-implemented method according to claim 14, the method further comprising:
 detecting, from the unit performance testing output, a unit performance testing failure associated with the one or more unit performance testing parameters; and
 restarting the unit performance testing process using one or more remedial steps.

16. The computer-implemented method according to claim 15, wherein the one or more remedial steps comprise changing infrastructure parameters associated with the unit of source code, wherein the infrastructure parameters comprise at least one of operating system, processing power, memory usage, and input/output operation rate.

17. The computer-implemented method according to claim 14, wherein the one or more unit performance testing parameters comprise at least one of sequential load instances, parallel load instances, response time thresholds, load duration, and load type.

18. The computer-implemented method according to claim 14, wherein the results of the unit performance testing process further comprise infrastructure health data before, during, and after the unit performance testing process.

19. The computer-implemented method according to claim 18, the method further comprising:
   executing, using a machine learning algorithm, a comparison of the infrastructure health data;
   generating a proposed infrastructure analysis based on the comparison of the infrastructure health data;
   recording the proposed infrastructure analysis to a unit performance testing database; and
   transmitting the proposed infrastructure analysis to one or more users.

20. The computer-implemented method according to claim 19, wherein the proposed infrastructure analysis comprises one or more suggested values for infrastructure parameters.

* * * * *